United States Patent [19]

Horiki

[11] 4,143,242

[45] Mar. 6, 1979

[54] ANALOG-DIGITAL CODE CONVERTER IN A DIGITAL TELEPHONE SWITCHING SYSTEM

[75] Inventor: Akira Horiki, Yokohama, Japan

[73] Assignee: Hitachi, Ltd., Japan

[21] Appl. No.: 815,422

[22] Filed: Jul. 13, 1977

[30] Foreign Application Priority Data

Jul. 14, 1976 [JP] Japan .................................. 51-82992
Jul. 8, 1977 [JP] Japan .................................. 52-80996

[51] Int. Cl.² .............................................. H04J 3/16
[52] U.S. Cl. ............................ 179/15 BW; 179/15 A; 179/15 AT; 179/15 BV; 179/15 BY
[58] Field of Search ....... 179/15 BW, 15 BV, 15 AT, 179/15 BY, 15 FD, 15 AS, 15 A

[56] References Cited

U.S. PATENT DOCUMENTS

| 2,920,143 | 1/1960 | Filipowsky | 179/15 AS |
| 3,701,851 | 10/1972 | Starrett | 179/15 FD |
| 4,013,842 | 3/1977 | Kao | 179/15 FD |
| 4,021,616 | 5/1977 | Betts | 179/15 BV |

*Primary Examiner*—David L. Stewart
*Attorney, Agent, or Firm*—Craig & Antonelli

[57] ABSTRACT

An analog-digital code converter in a digital telephone switching system is disclosed wherein when an analog voice signal from an analog line is applied to an analog per line unit it is sampled at a high rate and a high speed sampling digital code produced by ΔM-PCM modulation is converted to a low speed sampling digital code through a digital filter provided in a common unit for application to a time division digital speech path switch, and when a wide band broadcasting service signal from the same analog line is applied to the analog per line unit, a path is provided between the analog per line unit and the time division digital speech path switch which path bypasses the digital filter without allowing the conversion of the high speed sampling digital code of the analog per line unit to the low speed sampling digital code, whereby wide band communication as well as ordinary speech band communication are attained.

6 Claims, 4 Drawing Figures

ANALOG-DIGITAL CODE CONVERTER IN A DIGITAL TELEPHONE SWITCHING SYSTEM

LIST OF PRIOR ART REFERENCES (37 CFR 1.56(a))

The following references are cited to show the state of the art:

"An Approach to the Implementation of Digital Filters" by L. B. Jackson, J. F. Kaiser and H. S. McDonald, IEEE Trans. AE Vol. AU-16, No. 3, pp. 413 - 421, Sept. 1968

"Development in PCM Communication" by H. Inose and H. Miyagawa, published by Sanpo Co., Ltd. Sept. 15, 1974, pp. 268 - 269.

BACKGROUND OF THE INVENTION

1. Field of the Invention

The present invention relates to an analog-digital code converter in a digital telephone switching system wherein a wide band communication signal and a narrow band communication signal supplied from a common analog line are analog-digital converted and selectively connected to a time division multiplex speech path switch through a path having a plurality of frequency cut-off characteristics, one of which is selected depending on the type of the communication signal.

2. Description of the Prior Art

Where a time division digital switching system is to be introduced in a subscriber stage of a telephone network, it is necessary to install an analog-digital code converter in the subscriber line. Usually, it suffices to consider a voice frequency signal band up to 3.4 KHz. Taking a most typical PCM telephone switching system as an example, signal band components which are higher than 3.4 KHz are cut-off by a low-pass filter in an analog-digital code converter and the remaining components, i.e., those within the pass band, are sampled at 8 KHz and a predetermined coding rule is applied thereto to convert them to a PCM signal.

In such a primitive analog-digital code converter, however, a sampling rate is low and hence a higher rate is desired. One of the biggest problems is the necessity of providing a 3.4 KHz cut-off characteristic filter for each analog per line unit. This is very expensive.

In an approach to overcome the above problem, in a known analog-digital code converter employing a delta modulation PCM system which has been recently recognized to be advantageous with the development of digital integrated circuit technology and large scale integrated circuit technology, broadening of the band width is attained by increasing the sampling rate for modulation and demodulation in the analog per line unit (e.g., to 32 KHz instead of 8 KHz used in the prior system). This approach intends to attain economy by allowing a rough cut-off characteristic for the low pass filter used in the analog per line unit. In a common unit in which digital multiplexing and demultiplexing are performed, the high speed sampling digital code (32 KHz PCM) is passed through a digital filter to effect rate-conversion to produce a low speed sampling digital code (8 KHz PCM), which in turn, is communicated to a time division digital switch to perform time slot exchange. Accordingly, in spite of the fact that the analog per line unit of the analog-digital converter handles the high speed code (i.e., wide band signal), only the 8 KHz PCM (narrow band) is handled as the interface to the time division switch. As a result, the signal pass band is limited within 3.4 KHz. Although this does not raise a problem in ordinary voice switching, it does not allow wide band communication service such as broadcasting service which requires a signal pass band of up to 7 - 8 KHz. In other words, since the prior art analog-digital converter has been designed in circuit configuration so as to be most economic for the ordinary speech exchange, it cannot pass the signal band of above 3.4 KHz and lacks the expandability to additional services.

SUMMARY OF THE INVENTION

It is an object of the present invention to provide an analog-digital code converter which can product ordinary 8 KHz PCM code as well as high speed sampling PCM code in the order of 32 KHz so that it can pass a signal band up to at least 7 to 8 KHz for a particular communication such as broadcasting service.

In order to achieve the above object, in accordance with the present invention, there is provided an analog-digital code converter including analog per line units and a common unit, the analog per line units modulating and demodulating an analog input/output signal and a high speed sampling digital signal, and the common unit connected to the analog per line units having a modulation/demodulation digital filter to modulate and demodulate the high speed sampling digital signal with a 8 KHz PCM signal which is an interface of a time division speech path switch, the common unit being connected to the time division speed path switch, and a bypassing path in the common unit to allow feeding of the high speed sampling digital signal to the time division speech path switch without routing to the modulation/demodulation digital filter.

Thus, in ordinary switching, the 32 KHz PCM code is passed through the digital filter in the common unit for the conversion to the 8 KHz PCM code. On the other hand, when a communciation service which requires a wide band signal up to 7 to 8 KHz is required, the 32 KHz PCM code is not fed to the digital filter but taken directly for the application to the time division speech path switch. Assuming that a PCM code comprises 8 bits, the time division speech path switch performs information switching for 64 Kb/s information and 256 Kb/s information.

DESCRIPTION OF THE PREFERRED EMBODIMENTS

Figure 1:
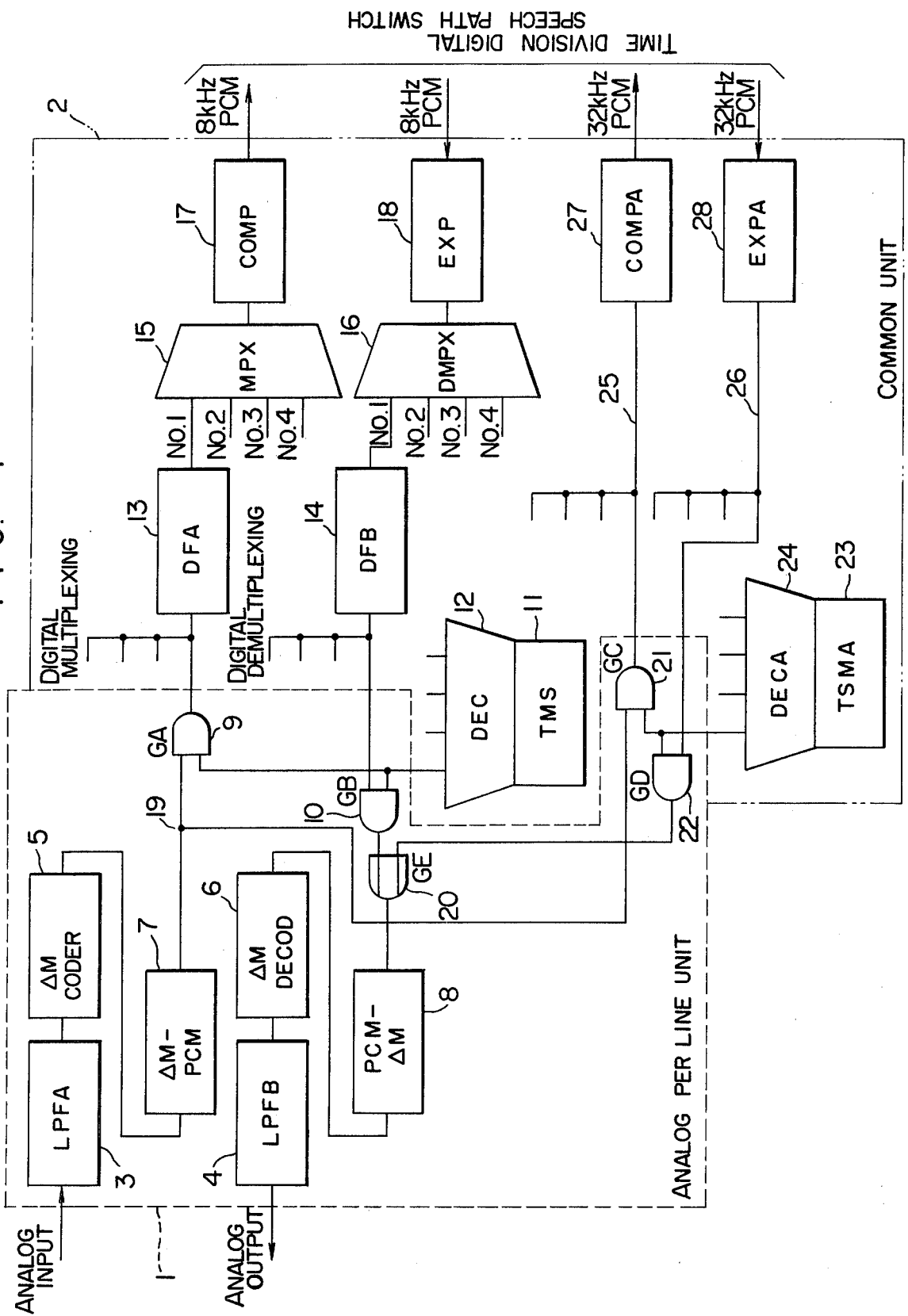
FIG. 1 shows a block diagram of an analog-digital code converter including an auxiliary highway for wide band communication.

Referring to the drawings, preferred embodiments of the present invention are now explained. FIG. 1 shows a block diagram of an analog-digital code converter in accordance with the present invention, including an auxiliary highway which is exclusively used for wide band communication. A plurality of analog per line units 1 are connected to a time division digital speech path switch through a common unit 2. A low-pass filter for modulation (LPFA) 3 and a low-pass filter for demodulation (LPFB) 4 each has a very rough high frequency cut-off characteristic of a pass band in the order of 8 KHz. A delta modulation coder (ΔM CODER) 5 and a delta moldulation decoder (ΔM DECOD) 6 operate at a higher sampling frequency (e.g., 32 KHz) than an ordinary sampling frequency to quantize information. Digital code conversion circuits 7 and 8 perform signal conversions of ΔM-PCM and PCM-ΔM, respectively. A sampling gate (GA) 9 and a desampling gate (GB) 10 function to perform digital multiplexing and demultiplexing of the PCM signal of the ordinary band at a sampling frequency of 32 KHz which is on-off controlled by a time slot memory (TSM) 11 and a decoder (DEC) 12.

By the mutual operation of the circuits described above, a linear PCM signal which is digital multiplexed at 32 KHz interval is derived, which signal is then fed to a digital filter for modulation (DFA) 13 in the common unit 2. The DFA 13 eliminates frequency components other than those in the signal band which extends up to 3.4 KHz by digital processing and it prevents the occurrence of a folding noise which would otherwise occur when the signal is resampled at 8 KHz. By passing the signal through the DFA 13, a linear PCM signal at 8 KHz interval is derived. This aids to economize the low-pass filter 3. On the other hand, a digital filter for demodulation (DFB) 14 interpolates the 8 KHz PCM signal to produce 32 KHz PCM signal by digital processing. Like the DFA 13, the DFB 14 also aids to economize the LPFB 4. Since the number of multiplexing for the DFA 13 and the DFB 14 is limited to a relatively small number, a set of digital filters is provided for every several lines (four lines in the illustrated embodiment) and a number of such groups (four groups in the illustrated embodiment) are digital multiplexed and demultiplexed by a multiplexor (MPX) 15 and a demultiplexor (DMPX) 16. The 8 KHz linear PCM signal multiplexed at a high bit rate is converted to a compressed PCM code or an expanded PCM code by a compressor (COMP 17 or an expander (EXP) 18, which code is supplied to or taken from the time division digital speech path switch. In this manner, an ordinary 8 KHz PCM exchange is performed.

The circuit configuration described so far is well known. According to the present invention, the per line unit additionally includes an auxiliary sampling gate (GC) 21, an auxiliary desampling gate (GD) 22 and an OR gate (GE) 20 for ORing an output of the desampling gate (GB) 10 and an output of the auxiliary sampling gate (GD) 22, and the common unit includes a bypassing highway 25 for bypassing the modulation digital filter DFA 13 between the output of the auxiliary sampling gate (GC) 21 and the time division speech path switch and a bypassing highway 26 for bypassing the digital filter for demodulation (DFB) 14 between the time division speech path switch and the input of the auxiliary desampling gate (GD) 22, and further includes an auxiliary time slot memory (TSMA) 23 and an auxiliary decoder (DECA) 24 for on-off controlling the auxiliary sampling gate (GC) 21 and the auxiliary desampling gate (GD) 22, and a compressor (COMPA) 27 and an expander (EXPA) 28 which are used to compress or expand the PCM signal fed through the bypassing path, those constituting a bypass means.

With this arrangement, for the communication service such as broadcasting service, which require a wide signal band up to 7 to 8 KHz, the 32 KHz PCM signal is branched at a junction 19 and merged at the OR gate (GE) 20 and assigned with time slots on the bypassing highways 25 and 26 which do not pass through the DFA 13 and the DFB 14. Thus, the line number is written into a corresponding address of the auxiliary time slot memory (TSMA) 23 and the auxiliary sampling gate (GC) 21 and the auxiliary desampling gate (GD) 22 are on-off controlled by the auxiliary decoder (DECA) 24. In this manner, the 32 KHz PCM code which is the output signal of the per line unit 1 is fed to the time division speech path switch through the auxiliary compressor (COMPA) 27 or the 32 KHz PCM code is taken from the time division speech path switch via the auxiliary expander (EXPA) 28. In the time division speech path switch, the information switching of 256 Kb/s with four 64 Kb/s channels is performed so that the frequency components up to 7 to 8 KHz are transmitted with a high fidelity to enable wide band communication service such as broadcating service.

In addition to providing the broadcasting service, the bypassing highway can be utilized in ordinary voice switching within an office, preventing the reduction in efficiency of the auxiliary highway which would be caused by the division of the highway and reducing the number of expensive digital filters.

In the above embodiment, a line exclusively used for the 32 KHz PCM is provided between the bypass circuit and the time division speech path switch and the time division speech path switch also requires an exclusive processing unit. In this embodiment, when the analog signal is a voice signal, it can be transmitted in parallel over the ordinary narrow band line and the present wide band bypass circuit, and when the analog signal is a wide band communication signal for broadcasting service, it is transmitted only over the wide band bypass circuit. As an alternative, the 8 KHz PCM line downstream of the compressor 17 and the expander 18 may be commonly used for both narrow band and wide band transmissions.

Figure 2:
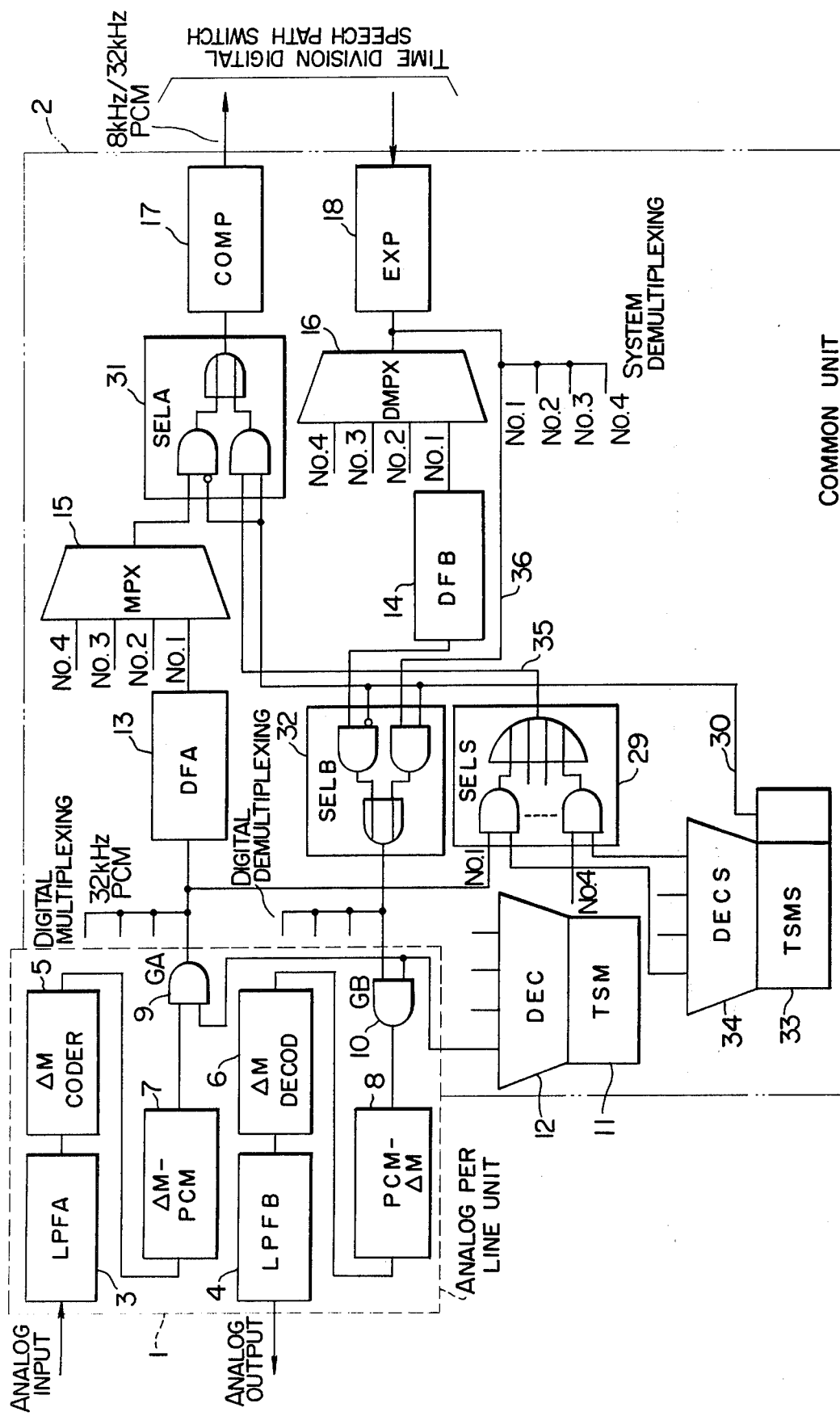
FIG. 2 shows a block diagram of an analog-digital code converter including a bypassing highway for wide band communication.

FIG. 2 shows a block diagram of another embodiment of the present invention. In this embodiment, added to the common unit of the prior art analog-digital code converter are bypassing highways 35 and 36 for wide band communication (32 KHz PCM code), a system selector (SELS) 29 for connecting the modulation bypassing highway 35 to an analog per line unit, a path selector for modulation (SELA) 31 for switching between the bypassing highway 35 and an ordinary modulation path (8 KHz PCM code), a path selector for demodulation (SELB) 32 for switching between the demodulation bypassing highway 36 and an ordinary demodulation path, a system time slot memory (TSMS) 33 and a system decoder (DECS) 34.

Figure 3:
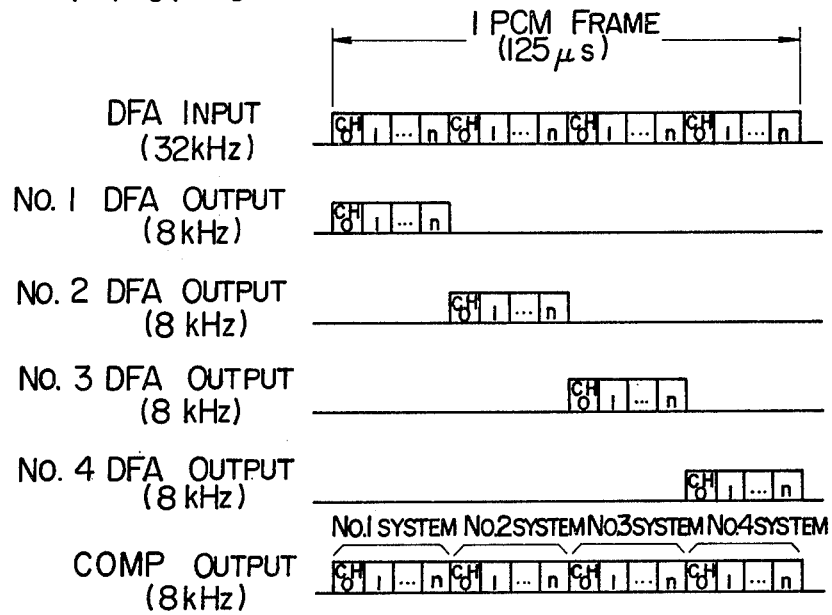
FIG. 3 shows configurations of digital signal trains in ordinary voice band communication in FIG. 1 and FIG. 2.

In ordinary voice switching (3.4 KHz band), the path selector for modulation (SELA) 31 and the path selector for demodulation (SELB) 32 for selecting either the 8 KHz PCM code or the 32 KHz PCM code are switched to the DFA 13 and DFB 14, respectively, under the control of service switching control information 30 ("0" information send.) Accordingly, the code conversion is carried out in exactly same manner as in the prior art system. FIG. 3 shows input and output digital signal trains of the digital filter 13 in the ordinary voice switching. FIG. 3 can be commonly applied to both FIG. 1 and FIG. 3. In the output digital signal train consisting of the 8 KHz PCM code, four DFAs 13 are provided for one group of lines in order to allow effective utilization of three fourths of a time domain in one PCM frame (125 μs), and phases of the respective output digital signal trains are offset by a quarter of one PCM frame (31.25 μs), which signal trains are digital multiplexed by the MPX 15 so that digital signal trains having multiplexed four times as much channels as the number of channels that one DFA 13 can handle can be derived. In a like manner, four DFB 14 are provided in the demodulation section so that the 8 KHz PCM code from the time division speech path switch is processed in an inverse manner to that in the modulation section.

For the wide band communication service up to 7 to 8 KHz such as broadcasting service, the bypassing highway 35 which routes the system selector (SELS) 29 is used. Since the bypassing highway 35 is shared by four systems, a time slot which is available to all systems must be selected. The selection of vacant slot is carried out by software. As the time slot is selected, a channel number is written into a corresponding address of the TSM 11 in a corresponding system, and a system number and switching control information 30 for the 32 KHz PCM communication are written into the same address of the system time slot memory (TSMS) 33. Thus, in the per line unit 1, the sampling gate (GA) 9 and the desampling gate (GB) 10 are gated in the same manner as in the ordinary voice switching. In the modulation section of the common unit 2, the system number read from the TSMS 33 is translated by the system decoder (DECS) 34 and the 32 KHz PCM signal from the corresponding system is multiplexed on the bypassing highway 35 in the SELS 29, the multiplexed signal being applied to one input terminal of the SELA 31. The SELA 31 is switched by the switching information 30 ("1" information) from the TSMS 33 so that the 32 KHz PCM signal from the bypassing highway 35 instead of the 8 KHz PCM signal from the DFA 13 is allowed to pass, which signal is then digital compressed in the COMP 17 and fed to the time division speech path switch.

Figure 4:
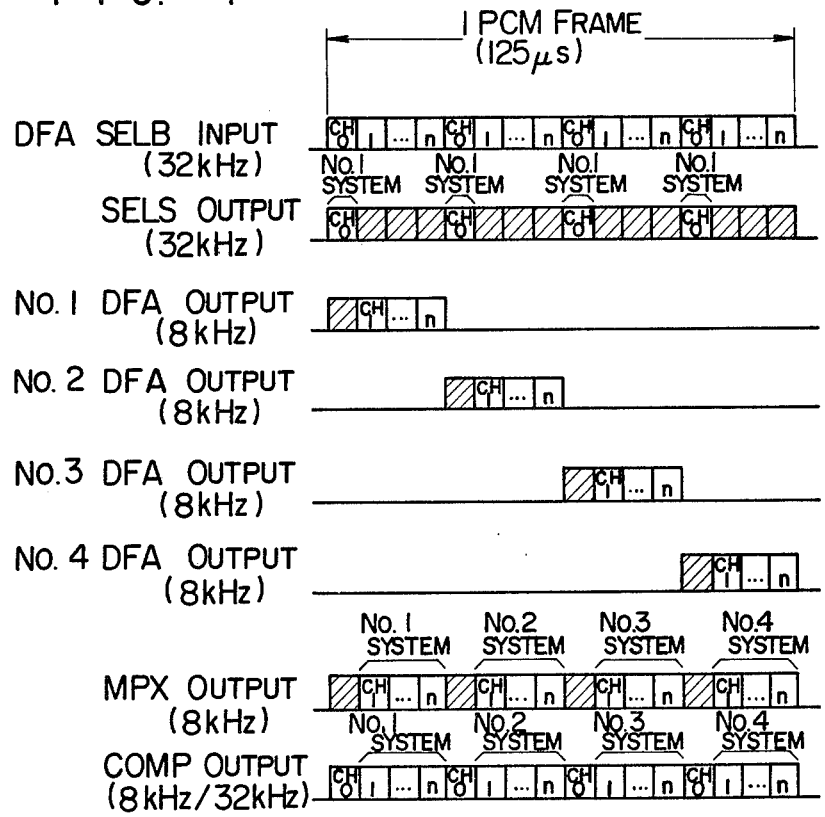
FIG. 4 shows configurations of digital signal trains where wide band (32 KHz PCM) communication calls are interleaved in the ordinary 8 KHz PCM communication calls.

FIG. 4 shows digital signal trains on the highways where 32 KHz communication calls are interleaved in the ordinary 8 KHz PCM communication calls in #0 channel of #1 system. The coding scheme on the highway which is multiplexed via the sampling gate (GA) 9 of the per line unit 1 is fixed (32 KHz PCM) independently of the type of communication. In this case, the output of the DFA 13 in each of the systems is assigned with time slots excluding CH0 as shown in FIG. 4, for the 8 KHz PCM signal. The 32 KHz PCM signal trains are allotted to the bypassing highway 35 via the SELS 29 while occupying the CH0 time slot of the respective system.

On the other hand, in the demodulation section, the 32 KHz PCM code sent from the time division speech path switch is expanded in the EXP 18, branched to the four systems and applied to the desampling gate GB 10 of the corresponding line while bypassing the DFB 14 and via the bypassing highway 36 under the control of the switching information 30 ("1" information) from the SELB 32, so that an analog signal is produced using the ΔM code as a medium. At this time, since the corresponding time slots (CH0 in the illustrated embodiment) in the other systems are blocked, no sampling gate 10 is closed. Although the expensive digital filters 13 and 14 are idling while the high speed sampling digital code (32 KHz PCM code) is being transmitted, this raises no practical problem if the traffic of the wide band communication service is sufficiently smaller than that of the ordinary voice switching.

While the output signal of the per line unit has been treated as the PCM code in the above explanation, the present invention is not limited to this particular coding but other coding such as differential PCM code may be used.

As described hereinabove, according to the present invention, a digital code having a different frequency cut-off characteristic than that of the ordinary voice switching can be derived by adding certain circuits to the analog digital code converter employing the digital filter. Accordingly, the present invention can provide service which requires wider signal band than that required in the ordinary voice switching.

What is claimed is:

1. An analog-digital code converter in a digital telephone switching system comprising:
   a plurality of analog per line units each including conversion means for effecting conversion between an analog voice signal and a high speed sampling digital code signal, the sampling rate of which is higher than that which results in an ordinary voice band; and
   common means connected to said analog per line units for digital multiplexing said digital code signal to be supplied from said plurality of analog per line units to a time division digital speech path switch and for digital demultiplexing digital code signals supplied from the time division digital speech path switch for application to said analog per line units;
   said common means including digital filter means connected to said analog per line units for effecting conversion between said high speed sampling digital code signal and a low speed sampling digital code signal which results in said ordinary voice band, highway means for carrying said low speed sampling digital code signal from said digital filter means to said digital speech path switch and bypass means for bypassing said digital filter means by applying said high speed sampling digital code signal from said analog per line units to said digital speech path switch.

2. An analog-digital code converter according to claim 1 wherein said bypass means includes an auxiliary highway carrying said high speed sampling digital code signal and control means for selectively connecting the output of a selected analog per line unit to said auxiliary highway.

3. An analog-digital code converter in a digital telephone switching system comprising:
   a plurality of analog per line units each including conversion means for effecting conversion between an analog voice signal and a high speed sampling digital code signal, the sampling rate of which is higher than that which results in an ordinary voice band; and
   common means connected to said analog per line units for digital multiplexing said digital code signal to be supplied from said plurality of analog per line units to a time division digital speech path switch and for digital demultiplexing digital code signals supplied from the time division digital speech path switch for application to said analog per line units;

said common means including conversion means connected to said analog per line units for effecting conversion between said high speed sampling digital code signal and a low speed sampling digital code signal which results in said ordinary voice band, a common highway for carrying said code signals to and from a time division digital speech path switch, switching means for selecting one of said high speed sampling digital code signal and said low speed sampling digital code signal which results in said ordinary voice band depending on the type of communication service and transferring the selected code between the time division digital speech path switch via said common highway, and time slot memory and decoder means for controlling said switching means for each analog per line unit, whereby said high speed sampling digital code is transferred directly while said low speed sampling digital code is transferred through said conversion means to effect high speed-low speed conversion.

4. In an analog-digital code converter in a digital telephone switching system comprising:

a plurality of analog per line units each connected to an analog line;

common means connected in common to said plurality of analog per line units for connecting said analog per line units to a time division digital speech path switch;

said analog per line units each including filter means having a wide band pass characteristic which extends beyond a voice band and coder-decoder means having a quantizing modulation/demodulation function at a first sampling frequency which is at least twice as high as the highest frequency of said wide band;

said coder-decoder means in said analog per line units each modulating an analog signal from said analog line to a high speed sampling digital signal for application to said common means and demodulating said high speed sampling digital signal to the analog signal for application to said analog line;

said common means including first digital filter means having a frequency cut-off characteristic beyond the voice band for resampling said high speed sampling digital signals from said analog per line units at a second sampling frequency which is at least twice as high as the highest cut-off frequency to produce resampling digital signals for application to said time division speech path switch, second digital filter means for interpolating said resampling digital signals fed from said time division speech path switch for supplying the high speed sampling digital signals to said analog per line units, and time slot memory and decoder means for controlling time division connection between said first and second digital filter means and said plurality of analog per line units;

the improvement comprising:

bypass means for bypassing said first and second digital filter means by connecting said analog per line units with said time division speech path switch;

said bypass means including a first circuit means for effecting transfer of said high speed sampling digital signals from said analog per line units to said time division speech path switch without routing through said first digital filter means in said common means, and second circuit means for effecting transfer of said high speed sampling digital signal from said time division speech path switch to said analog per line units without routing through said second digital filter means.

5. An analog-digital code converter according to claim 4 wherein;

said first and second circuit means include an auxiliary sampling gate and an auxiliary desampling gate, respectively;

said bypass means further including auxiliary time slot memory and decoder means for on-off controlling said auxiliary sampling gate and said auxiliary desampling gate whereby the gates corresponding to said respective analog per line units are opened or closed in time division fashion to open or close said first and second circuit means.

6. An analog-digital converter according to claim 4 wherein;

said first circuit means includes a wide band modulation bypass highway capable of passing said high speed sampling digital signal therethrough, a system selector having an input connected to the input of said first digital filter means and an output connected to the input of said wide band modulation bypass highway and modulation selector means for selectively connecting the output of said system selector and the output of said first digital filter means to said time division speech path switch;

said second circuit means including a wide band demodulation bypass highway capable of passing said high speed sampling digital signal therethrough, which signal is fed by branching the input signal to said second filter means from said time division speech path switch, and demodulation selector means for selectively connecting the output of said wide band demodulation bypass highway and the output of said second digital filter means to said analog per line units;

said bypass means including auxiliary system time slot memory and decoder means for driving said selector means for modulation and demodulation during wide band transmission to connect said wide band modulation bypass highway to said time division speech path switch and said wide band demodulation bypass highway to said analog per line units, respectively, while simultaneously driving said system selector to supply the input signal at the input of said first digital filter means from said analog per line units to the input of said wide band demodulation bypass highway in time division fashion.

* * * * *